United States Patent Office 3,443,839
Patented May 13, 1969

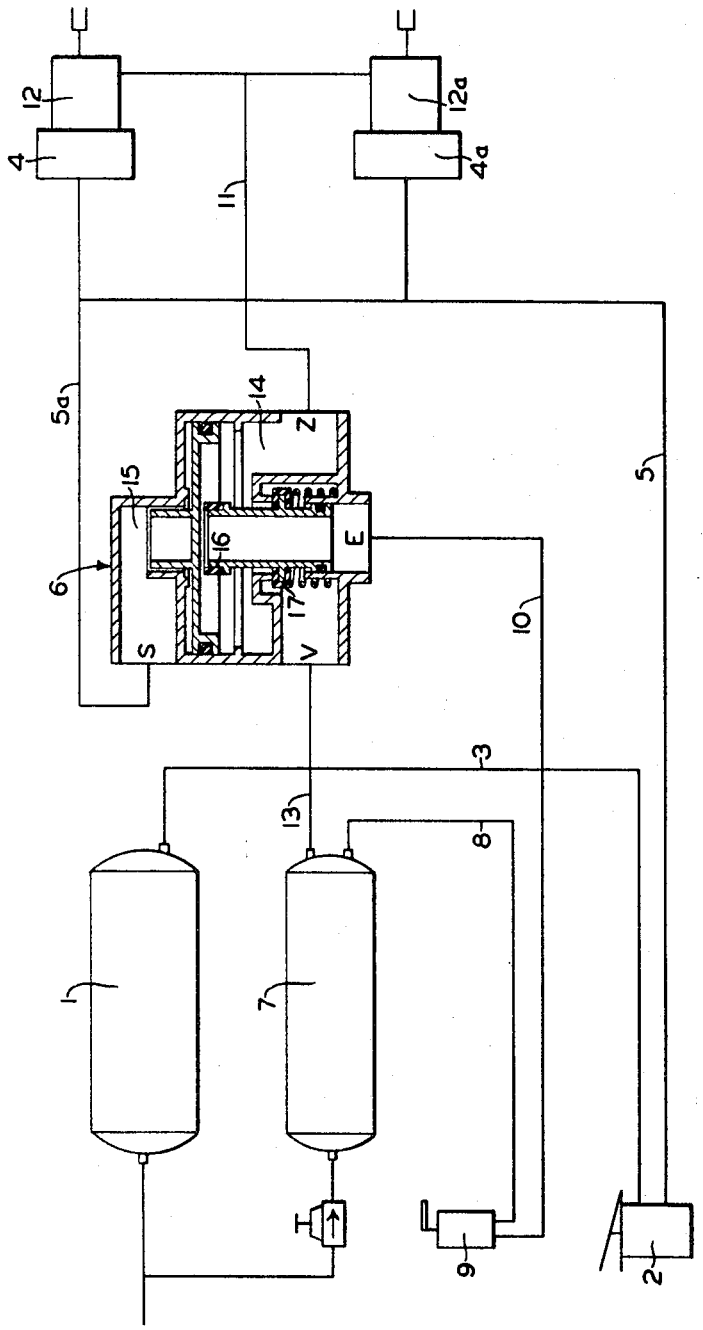

---

3,443,839
FLUID PRESSURE BRAKING APPARATUS COMBINED WITH SPRING-APPLIED BRAKING APPARATUS
Horst Hinrichs and Walter Mensing, Hannover, Germany, assignors to Westinghouse Bremsen- und Apparatebau, G.m.b.H., Hannover, Germany
Filed Feb. 8, 1968, Ser. No. 704,125
Claims priority, application Germany, Feb. 16, 1967, W 43,373
Int. Cl. B60t 13/74, 15/16; B61h 13/08
U.S. Cl. 303—2
2 Claims

ABSTRACT OF THE DISCLOSURE

A fluid pressure service braking apparatus for vehicles and an auxiliary spring-applied braking apparatus intercoupled by a relay valve device to provide independent or simultaneous actuation of the service brake apparatus and the auxiliary brake apparatus and, at the same time, prevent such apparatus from additively exceeding the full braking effect of the service brake, thereby minimizing the possibility of wheel lock due to excessive braking force.

---

Background of invention

Heretofore, it has been proposed to provide a pneumatic braking arrangement for street vehicles and movable work machines comprising a service brake combined with an auxiliary brake in which the service brake includes a first air supply reservoir, a service brake valve, and a service brake cylinder, and in which the auxiliary brake system comprises a unidirectional overflow valve, a second air supply reservoir, an auxiliary brake valve and a spring-applied brake cylinder. Whenever both brake systems are actuated at the same time, the brake forces of both brake systems are added, leading to overbraking and possible wheel lock. It has been attempted to diminish the additive effect of the two braking systems by means of various arrangements, such as by utilization of two rapid release valves, thereby permitting a mixing of the air of both braking systems.

It is an object of the present invention to provide a service brake apparatus and an auxiliary brake apparatus in separate systems intercoupled by a relay valve device in such fashion as to provide either independent or simultaneous operation of the two braking systems and, at the same time, prevent the additive braking effect of the two systems for exceeding the full braking effect of the service brake system.

Summary

The present invention utilizes a conventional relay valve device in which the usual exhaust port is connected to the outlet or control port of the auxiliary brake valve device, which, in turn has a supply port connected with the second air supply reservoir. The control pressure port of the relay valve is connected to the service brake cylinders, while the brake cylinder port of the relay valve is connected with the air pressure piston chamber of the spring-applied brake cylinder of the auxiliary brake system.

The invention is described hereafter in connection with the accompanying drawing in which the single figure comprises a schematic diagram of the combined service brake apparatus and auxiliary brake apparatus.

Referring now to the drawing, it is seen that the service brake apparatus comprises a first air reservoir 1 connected to the service brake valve 2 by way of piping 3, which valve is connected to both service brake cylinders 4 and 4a by way of piping 5.

Branch piping 5a of piping 5 is connected to the control pressure connection S of the relay valve device 6.

The auxiliary braking system comprises an individual second air supply reservoir 7 from which the piping 8 leads to the auxiliary brake valve device 9, which in turn is connected by way of piping 10 to the outlet E of the relay valve device 6. Piping 11 connects the brake cylinder connection Z of the relay valve device to the pneumatic piston chamber of the spring-applied cylinder 12. The second air supply reservoir 7 is connected via piping 13 to the relay valve connection V.

The aforementioned relay valve device 6 is of a well-known conventional type, which heretofore has been used for the rapid charging and discharging of air pressure cylinders and air pressure couplings to shorten the brake application times in well-known brake arrangements for power vehicles. The new use of this relay device in the present arrangement in accordance with the present invention merely requires that the outlet connection E is equipped with a piping connection for connection to piping 10, as hereinbefore described.

In now describing the operation of the service brake apparatus and the auxiliary brake apparatus, as above described, it will be seen that in the brake release position, the auxiliary brake valve 9 is operated to charge piping 10 which in turn charges chamber 14 in the relay valve device, the piping 11, and the spring-applied brake cylinders 12 and 12a with the full reservoir pressure. At the same time, the brake cylinders 4 and 4a are exhausted through piping 5 and the service brake valve 2. Under these conditions, the branch piping 5a and the valve chamber 15 in the relay valve device 6 are depressurized so that the valve 16 in the relay valve device 6 is in the open condition.

In now applying the brakes by operation of the service brake apparatus alone, the service brake valve 2 is operated to charge the piping 5 and 5a, to thereby charge the service brake cylinders 4 and 4a, and also the chamber 15 of the relay valve device, with a pressure that will not exceed the pressure which exists in the chamber 14 of the relay valve device. Accordingly, the relay valve 16 remains open and the spring-applied brake is in the released condition.

If now it is desired to operate the auxiliary braking system alone, the auxiliary brake valve 9 is operated to exhaust the spring supply cylinders 12 and 12a by way of the piping 11, the valve chamber 14 and the piping 10. Since under these conditions the valve chamber 15 remains uncharged, the valve 16 therefore remains open. Therefore, it is seen from the foregoing that both the service brake apparatus and the auxiliary brake apparatus may be actuated at the same time. However, when both braking systems are simultaneously actuated, as soon as the pressure in chamber 15 becomes greater than that in chamber 14, the valve 16 closes, whereupon the valve 17 is opened and the pressure in chamber 14 is increased by way of piping 13 connected to reservoir 7 to thereby correspondingly release the spring-applied brakes. It is seen that with a full braking force applied by the service brake apparatus, the auxiliary brake apparatus is fully released. Therefore, since a failure due to locked brakes, as a consequence of additive braking forces of the two independent systems, cannot take place, the wheel brakes may not be mechanically excessively applied.

Having now described the invention, what we claim as new and desire to secure by Letters Patent, is:
1. Braking apparatus, comprising:
   (a) a fluid pressure operated service braking system, comprising:
      (i) a first fluid pressure reservoir;
      (ii) a fluid pressure operated brake cylinder means; and

(iii) a service brake valve device operable to communicate said first fluid pressure reservoir to said fluid pressure operated brake cylinder means to apply the brakes or to exhaust said fliud presrsure operated brake cylinder means to release the brakes;
(b) a spring-applied auxiliary braking system, comprising:
(i) a spring-applied brake cylinder means;
(ii) a second fluid pressure reservoir;
(iii) means including an auxiliary brake valve device for communicating said second fluid pressure reservoir to charge said spring-applied brake cylinder means to release the brakes or to exhaust said spring-applied brake cylinder means to apply the brakes; and
(c) means operable in response to a preponderance of fluid pressure in said service braking system over that in said auxiliary braking system, when both braking systems are actuated to apply braking force in each system, to communicate said second fluid pressure reservoir to provide brake release pressure in said spring-applied brake cylinder means in direct correspondence with said preponderance of fluid pressure.

2. Braking apparatus, comprising:
(a) a first and second fluid pressure reservoirs;
(b) spring-applied brake cylinder means;
(c) fluid pressure operated brake applying cylinder means;
(d) a service brake valve device having a control port and operable to communicate said control port to said first fluid pressure reservoir or to exhaust;
(e) an auxiliary brake valve device having a second control port and operable to communicate said second control port to said second fluid pressure reservoir or to exhaust;
(f) means providing a piston chamber having a piston therein;
(g) one end of said piston chamber on one side of said piston communicating with said service brake control port and said fluid pressure operated brake applying cylinder means;
(h) the other end of said chamber on the other side of said piston communicating with said spring-applied brake cylinder means;
(i) a second chamber communicating said second reservoir with said chamber on said other side of said piston via a valve seat;
(j) a valve in said second chamber biased to seat on said valve seat;
(k) a hollow valve stem carried by said valve and extending into said chamber on said other side of said piston communicating said auxiliary brake valve control port with said chamber on said other side of said piston;
(l) said piston and said valve stem so disposed that upon a predominance of pressure in said chamber on said one side of said piston relative to pressure in said chamber on said other side of said piston, said piston moves a first increment to seat on the end of said valve stem in said chamber and upon further movement unseats said valve.

References Cited
UNITED STATES PATENTS
3,116,095   12/1963   Leighton _____ 303—9

MILTON BUCHLER, *Primary Examiner.*

JOHN J. McLAUGHLIN, JR., *Assistant Examiner.*

U.S. Cl. X.R.

303—9, 13, 29, 40